United States Patent [19]
Graham et al.

[11] 3,977,472
[45] Aug. 31, 1976

[54] METHOD OF FRACTURING SUBTERRANEAN FORMATIONS USING OIL-IN-WATER EMULSIONS

[75] Inventors: John W. Graham; Clay Gruesbeck; William M. Salathiel, all of Houston, Tex.

[73] Assignee: Exxon Production Research Company, Houston, Tex.

[22] Filed: Oct. 16, 1975

[21] Appl. No.: 623,198

[52] U.S. Cl. .............................. 166/283; 166/308; 252/855 R
[51] Int. Cl.² ........................................ E21B 43/26
[58] Field of Search ............... 166/308, 305 R, 271, 166/283, 281, 259; 252/8.55 R

[56] References Cited
UNITED STATES PATENTS

| | | | |
|---|---|---|---|
| 2,742,426 | 4/1956 | Brainerd | 166/283 X |
| 2,793,998 | 5/1957 | Brainerd et al. | 252/8.55 R |
| 3,147,806 | 9/1964 | Reed et al. | 166/283 |
| 3,185,217 | 5/1965 | Brooks, jr. et al. | 166/305 R X |
| 3,353,600 | 11/1967 | Annis et al. | 166/293 |
| 3,710,865 | 1/1973 | Kiel | 166/308 |
| 3,818,993 | 6/1974 | Gogarty et al. | 166/308 |

*Primary Examiner*—Stephen J. Novosad
*Assistant Examiner*—George A. Suckfield
*Attorney, Agent, or Firm*—Salvatore J. Casamassima

[57] ABSTRACT

A hydraulic fracturing method wherein a viscous oil-in-water emulsion is injected into a formation under sufficient pressure to fracture the formation. The emulsion contains from about 70 to about 90 volume percent of an internal liquid hydrocarbon phase, from about 10 to about 30 volume percent of an external aqueous phase and sufficient amounts of a nonionic surfactant to stabilize and viscosify the emulsion. The preferred hydrocarbon phase concentration is between about 75 and 85 volume percent. The nonionic surfactant also gives the emulsion a breaking temperature which is not greater than the temperature of the formation. Preferably, an electrolyte is used to adjust the temperature at which the emulsion will break. After fracturing is completed the emulsion is then left in the wellbore for a sufficient time to permit the temperature of the emulsion to reach its breaking temperature. Upon breaking, the emulsion reverts to a low viscosity fluid which is readily removable from the formation.

23 Claims, 3 Drawing Figures

METHOD OF FRACTURING SUBTERRANEAN FORMATIONS USING OIL-IN-WATER EMULSIONS

BACKGROUND OF THE INVENTION

1. Field of the Invention

This invention relates to the hydraulic fracturing of subterranean formations surrounding oil wells, gas wells and similar boreholes. In one aspect it relates to a fracturing method employing an improved fracturing fluid.

2. Description of the Prior Art

Hydraulic fracturing is a widely used stimulation technique for increasing the production of crude oil and natural gas from wells in low permeability formations. The method normally involves the injection of a fracturing fluid into a well at a rate and pressure sufficient to propagate a fracture adjacent the well. Propping agent particles suspended in the fracturing fluid maintain the fracture in a propped condition when the applied pressure is relieved.

A fracturing fluid should have a high viscosity when injected into the well. High viscosity fluids tend to generate wider and longer fractures and are capable of maintaining large, high density propping agent particles in suspension. There are two basic types of high viscosity fracturing fluids—emulsions and fluids containing polymers. Although these fluids give good fracturing results they do have certain disadvantages. One problem is that they are difficult to recover from the formation. Removal of the fracturing fluid, known as well clean-up, is usually accomplished by the flushing action of the formation fluid flowing in the well. However, this technique is normally not adequate when a high viscosity fracturing fluid is used, especially in tight formations or low pressure formations.

Emulsion fracturing fluids get their high viscosity from the dispersion of a major proportion of an oil internal phase in a minor proportion of an external aqueous phase. The emulsion must be stabilized by a surfactant. To reduce the viscosity of the emulsion to permit easy removal of the fracturing fluid it is necessary to break the emulsion into a water-in-oil invert or into its component phases. The emulsion is usually broken by eliminating the stabilizing effect of the surfactant. This is normally accomplished either by adsorption of surfactant on the formation walls or by the addition of a demulsifying agent. Normally, only cationic surfactants are susceptible to adsorption on to formation materials because of their affinity for sand surfaces. If, on the other hand, a demulsifier is used, the demulsifier and surfactant must be carefully matched so that the emulsion begins to break only after fracturing is completed. Even with suitably matched demulsifiers and surfactants, it is not easy to accurately time the breaking of the emulsion and there is always the danger that demulsification will either take place prematurely or will be delayed for an unacceptably long period of time.

The second category of high viscosity fluids is the polymerically thickened fluid. A polymer, such as guar gum, is used in the fluid as a thickening agent to greatly increase its viscosity. The polymer also tends to reduce pumping friction losses and certain polymers (e.g., guar gum) also impart fluid loss control.

Polymerically thickened fluids, however, also present removal problems once the fracturing operation is completed. Consequently, polymer degradation systems must be devised to break down the polymer in order to reduce the viscosity of the fluid. The polymer can be destroyed by enzymatic action, acidification, oxidation or hydrolysis. For example, guar gum is normally broken down by cellulose enzymes whereas synthetic cellulose derivatives, which are only slightly susceptible to enzymes, are usually oxidized. The selection of a suitable method for destroying the polymer is not an easy task because the activity of oxidizers and enzymes is often sensitive to pH, salinity, and temperature. Buffers frequently must be used to improve the effectiveness of the oxidizer enzyme. At formation temperatures in excess of 165°F, both enzymes and oxidizers lose much of their effectiveness and hydrolytic polymer degradation is necessary. Improper selection of a suitable method for destroying the polymer will result in insufficent viscosity reduction.

The degraded polymer, however, creates additional problems. For example, degraded guar gum is not completely water soluble and frequently leaves a residue in the formation which can greatly reduce fracture permeability. Thus, the increased fracture conductivity obtained with the polymer fluid can be significantly offset by permeability reductions caused by guar gum residues. (See SPE Paper 5114 entitled "Effect of Fracturing Fluids on Fracture Conductivity" by C. E. Cooke, Jr., which analyzes the problem of polymer residues.)

Another problem with polymers is that they are sensitive to the formation environment. Contaminants found in field grade waters which alter the pH or salinity of the fracturing fluid are responsible for substantial variations in polymer fluid viscosities. A detailed analysis of the substantial effect of pH and ionic concentration on polymer viscosity can be found in SPE Paper 5005 entitled "Use of Guar Gum and Synthetic Cellulose in Oilfield Stimulation Fluids" by R. W. Anderson and J. W. Baker. Once again, buffers must be used to counteract interference by contaminated ions, thus necessitating an analysis of field grade waters to determine the type of ions present and their concentration.

A more recent development is a fracturing fluid consisting of an oil-in-water emulsion containing a polymer. As described by O. M. Kiel in U.S. Pat. No. 3,710,865 and by Sinclair et al in *J. Pet. Tech* (July, 1974), pp. 731–738, the preferred composition of this fracturing fluid is an oil-in-water emulsion comprising from 60 to 75 volume percent of an internal oil phase and an aqueous phase containing about 0.5 weight percent of a cationic surfactant and about 0.5 weight percent of a polymer.

Generally, oil-in-water emulsions containing an oil phase concentration of less than 75 volume percent do not exhibit sufficient viscosity to be suitable as a fracturing fluid. The addition of the polymer, however, gives the emulsion the desired viscosity. Furthermore, less polymer is needed than with other types of polymer fluids such as gelled waters and gelled acids.

Although a good fracturing fluid, the polymer emulsion is especially difficult to remove from the formation because both the polymer and the emulsion significantly contribute to the high viscosity of the fluid. Consequently, mechanisms are needed to reduce the viscosity contribution of both. The polymer emulsion is usually made to convert to a low viscosity fluid by a combined demulsification and polymer degradation system. The breaker system must permit completion of the fracturing treatment before acting and then must act quick enough to minimize recovery time. Related polymer problems such as degradation residues and ionic sensitivity are also present when the polymer emulsion is used.

SUMMARY OF THE INVENTION

The present invention provides an improved fracturing method employing an oil-in-water emulsion prepared by the use of nonionic surfactants which are capable of stabilizing the emulsion at high internal phase oil concentrations and which permit the emulsion to break by temperature responsive phase inversion. The fracturing method comprises the steps of injecting the emulsion into a subterranean formation at a pressure sufficient to fracture the formation and thereafter breaking the emulsion by causing the emulsion to reach its breaking temperature.

The emulsion comprises from about 70 to about 90 volume percent of an internal oil phase, from about 10 to about 30 volume percent of an external aqueous phase and a nonionic surfactant. Preferably the internal phase should comprise from about 75 to about 85 volume percent of the emulsion. The nonionic surfactant must be added in sufficient amounts to stabilize the emulsion and to maximize emulsion viscosity. Generally, the nonionic surfactant should comprise from about 1 to 6 weight percent of the aqueous phase, but oil phase concentration in excess of 85 percent may require greater amounts of surfactant. The surfactant should be added in an amount sufficient to impart a viscosity to the emulsion of at least 100 centipoises measured at 70°F and a shear rate of about 500 reciprocal seconds.

Because of the high oil phase and surfactant concentrations, the emulsion will have the desired high viscosity without the addition of polymer. However, small amounts of suitable polymers such as guar gum can be added to reduce pumping friction loss or to control fluid loss. The polymer can comprise less than 0.1 weight percent of the aqueous phase and can impart less than a 10 centipoise viscosity to that phase. Since the polymer does not significantly contribute to viscosity, it does not have be degraded to permit easy removal of the fracturing fluid. Only the emulsion needs to be broken. Problems associated with degraded polymer residues and polymer sensitivity are thus avoided. Furthermore, such small concentrations of polymer would not render the emulsion sensitive to formation contaminants.

Emulsions prepared with nonionic surfactants are temperature insensitive over a wide temperature range. However, when the emulsion reaches a certain temperature, known as the breaking temperature, the emulsion destabilizes and begins to revert to two phases. This phenomenon, referred to herein as "breaking of the emulsion" occurs because nonionic surfactants display inverse temperature solubility. The surfactant is selected so that the emulsion breaking temperature is slightly less than the normal temperature of the subterranean formation. After the formation is fractured the emulsion begins absorbing heat which is generated within the formation and its temperature rises. Before the temperature of the emulsion attains the temperature of the formation, it will reach its breaking temperature and will separate into its two component phases or form a water-in-oil invert. The broken emulsion will have a viscosity significantly lower than the viscosity of the original emulsion and will, therefore, be readily removable from the formation. The emulsion breaking temperature can be adjusted by the addition of a suitable electrolyte. The addition of KCl or NaCl, for example, will depress the breaking temperature. In this manner, the proper combination of surfactant and electrolyte can be used to cause the emulsion to break at a predetermined temperature.

The type of surfactant usable in the present invention can be selected from a wide variety of nonionic emulsifiers. The polyoxyethylene derivatives, such as ethoxylated alcohols and phenols, are preferred. However, any nonionic surfactant which renders a stable, viscous emulsion and which gives the emulsion the desired breaking temperature is suitable.

Laboratory experiments and field tests have shown that the emulsion employed in the present method has the characteristics required for a fracturing fluid. The emulsion is highly viscous during fracturing treatment but is readily removed from the formation when fracturing is completed. It exhibits relatively low friction loss in the well conduit, high friction loss in the fracture, low fluid loss in the fracture, and good proppant suspension capabilities. The emulsion is also insensitive to formation contaminants and does not require the addition of buffers or other chemical additives to maintain viscosity at a stable level.

DESCRIPTION OF THE PREFERRED EMBODIMENTS

Figure 1:
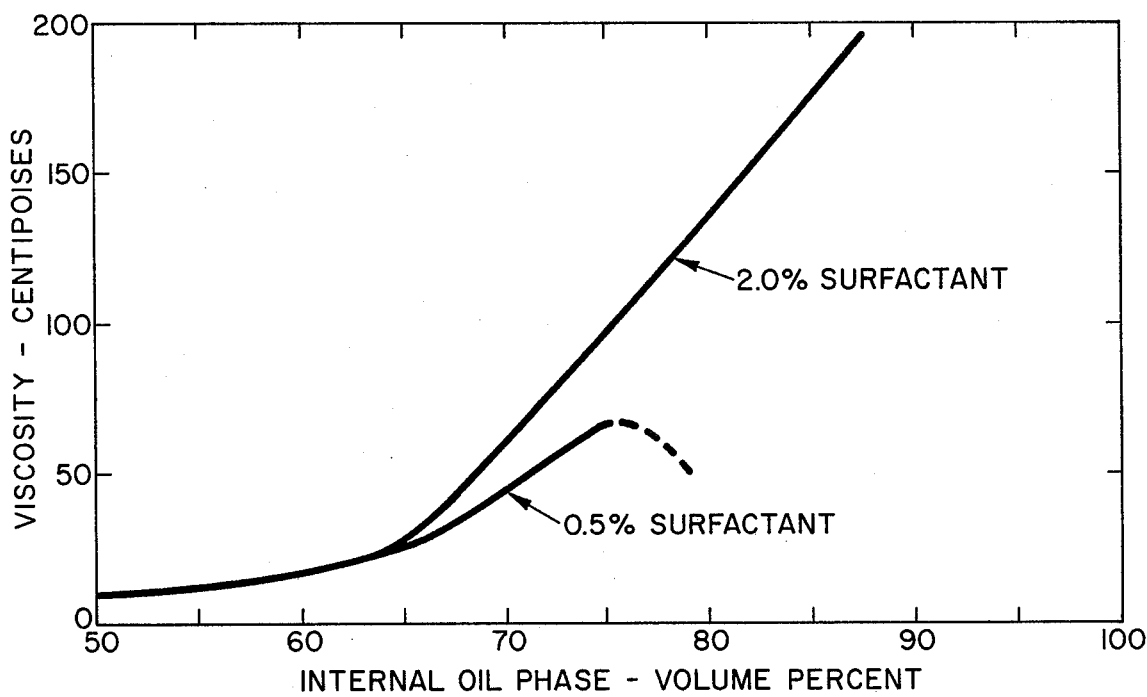
FIG. 1 is a plot showing the relationship between viscosity and internal oil phase concentration for two oil-in-water emulsions having different concentrations of a nonionic surfactant.

The fracturing method of the present invention employs an improved oil-in-water emulsion comprising from about 70 to about 90 volume percent of an internal oil phase, from about 10 to about 30 volume percent of an external aqueous phase and a nonionic surfactant which is added in sufficient amounts to stabilize the emulsion and which imparts to the emulsion a viscosity of at least 100 centipoises measured at 70°F and a shear rate of 500 reciprocal seconds. Preferably the surfactant will comprise about 1.0 to 6.0 weight percent of the aqueous phase. The fracturing method is carried out by injecting the emulsion under sufficient pressure to fracture the formation and thereafter breaking the emulsion by causing the emulsion to reach its breaking temperature.

The emulsion can be made by a continuous or batch mixing technique. Preferably, the nonionic surfactant is first dissolved or dispersed in the aqueous phase. The oil is then gradually introduced and stirred into the aqueous phase until an emulsion of the desired composition is achieved. The greater the concentration of the oil phase, the more agitation and stirring will be needed to obtain a uniform emulsion.

A preferred concentration for the oil phase would be from about 75 to about 85 volume percent. Concentrations above 85 percent may require excessively large quantities of surfactant to achieve stabilization, while concentrations below 75 percent may require excessively large quantities of surfactant to reach the desired viscosity. The range of 75 to 85 percent normally gives a highly stable emulsion with an apparent viscosity in excess of 100 centipoises when measured at 70°F and a shear rate of 500 reciprocal seconds. Small amounts of polymer comprising less than 0.1 weight percent of the aqueous phase and imparting less than 10 centipose viscosity to that phase, can be added to reduce friction pumping loss or to control fluid loss. However, even without the addition of any polymer, the emulsion will have sufficient viscosity to properly suspend propping agent particles such as sand.

The addition of the nonionic surfactant serves two functions. The first function is to stabilize the emulsion and enhance its viscosity. Sufficient quantities of the surfactant must be added to promote stabilization and to maximize the viscosity of the emulsion. Generally, the surfactant can comprise from about 1.0 about 6.0 weight percent of the aqueous phase. When the oil phase concentration is in the preferred range of 75 to 85 volume percent then the preferred surfactant concentration will be in the range of from 2.0 to 4.0 weight percent of the aqueous phase. Since nonionic surfactants are insensitive to water hardness or the presence of ionic impurities, water softeners or other chemical additives are not needed.

The second function of the nonionic surfactant is to provide a breaking mechanism for the emulsion. Nonionic surfactants display inverse temperature solubility, i.e., they are more soluble in cold water than in hot water. The temperature at which a nonionic surfactant becomes substantially insoluble in water is known as its cloud point. An emulsion which is stabilized by a nonionic surfactant will therefore reflect this inverse temperature solubility characteristic and will destabilize when the emulsion increases to its breaking temperature. The emulsion breaking temperature, however, is not equal to the cloud point of the surfactant. Generally, the emulsion breaking temperature is about 20°F to 60°F greater than the cloud point. It is believed that a microscopic phase inversion occurs at the cloud point but that a true macroscopic destabilization does not occur until the emulsion breaking temperature is reached. The macroscopic destabilization is characterized by the emulsion separating into its two component phases or forming a water-in-oil invert.

The present invention utilizes this inverse temperature phenomenon as a means for achieving easy removal of the fracturing fluid from the well formation after the fracturing operation is completed. The heat generated by the formation is used to break the emulsion. The surfactant must be selected or formulated so that the emulsion breaking temperature is below the normal temperature of the subterranean formation. A preferred breaking temperature would be from about 1°F to about 40°F less then the normal formation temperature. Once the formation has been fractured, the emulsion begins to absorb heat generated within the formation and its temperature begins to rise. When the emulsion reaches its breaking temperature, it begins to destabilize into a two phase or invert system which is substantially less viscous than the original emulsion and which is readily removable from the well formation.

Unlike prior emulsion fracturing fluids, no special breaker systems are needed to reduce the viscosity of the emulsion. Consequently, well cleanup is significantly simplified.

The selection or formulation of the nonionic surfactant is critical to successful breaking of the emulsion. For example, if a formation temperature of 200°F is encountered, an emulsion having a breaking temperature of 180°F to 190°F would be desirable. A surfactant or blend of surfactants would have to be selected which give the emulsion a breaking temperature in that range. However, the selection of a suitable surfactant can be simplified by using an electrolyte to adjust the emulsion breaking temperature since the presence of an electrolyte modifies the cloud point of the nonionic surfactant. Examples of electrolytes which depress cloud points are sodium citrate, sodium sulfate, potassium sulfate, lithium sulfate, berrylium sulfate, sodium hydroxide, sodium bisulfate, sodium acetate, sodium bromate, magnesium chloride, sodium chloride, calcium chloride, cesium chloride, potassium chloride, lithium chloride and potassium nitrate. A small minority of electrolytes, such as magnesium iodide, sodium iodide, berrylium nitrate, magnesium nitrate, and calcium nitrate, normally raise the cloud point of nonionic surfactants. By modifying the cloud point, proportional modification of the emulsion breaking temperature can be achieved. It should be noted that the amount of electrolyte as well as the type of electrolyte selected will affect modification of the breaking temperature. Generally, the greater the amount of electrolyte, the greater the change in the breaking temperature. Although any concentration of electrolyte, up to saturation, can be employed in the aqueous phase, a preferred concentration range is 1.0 to 10.0 weight percent.

The addition of electrolytes can thus render suitable a previously unsatisfactory surfactant. For example, an ethoxylated linear secondary alcohol with 11 to 15 carbon atoms and 12 moles of ethylene oxide will normally give an emulsion a breaking temperature in excess of 200°F. If a breaking temperature of about 180°F is desired, then this surfactant will not be suitable. However, the addition of about 8 weight percent of NaCl to the aqueous phase will depress the breaking temperature to about 180°F. The proper selection and combination of nonionic surfactant and electrolytes can yield an emulsion which will break at almost any pre-selected temperature.

The surfactant can be selected from a wide variety of nonionic surfactants such as derivatives of glycerides, glucosides, polyoxyethylene or polyoxypropylene. The preferred surfactants usually are derivates of polyoxyethylene. The oleophilic moeity of the polyoxylethylene surfactant is normally derived from a polar chemical such as an alcohol, an alkyl phenol, a cresol, a fatty acid, an amide, an amine, or a mercaptan. Ethoxylated linear alcohols with 11 to 15 carbon atoms and ethoxylated nonyl phenols have been found to be particularly well suited for the preparation of emulsions with breaking temperatures in the 140°F to 300°F range. The hydrophilic moeity of these surfactants should have about 10 to 20 moles of ethylene oxide. Sufficient amounts of electrolytes, preferably NaCl or KCl, can be used in conjunction with the surfactant to achieve the desired breaking temperature.

The liquid hydrocarbon selected as the internal oil phase can be a crude oil or a refined petroleum fraction such as diesel oil, gas oil, kerosene, gasoline, and the like. Particular hydrocarbons, such as benzene, toluene, ethylbenzene, cyclohexane, heptane, decane, hexadecane and the like can also be used. Crude oil, however, is preferred because it is usually readily available and compatible with the formation. However, if crude oil is unavailable, then hydrocarbon liquids which have a viscosity less than about 10 centipoises at formation temperature are preferred.

Small amounts of a polymeric thickening agent can be added to the aqueous phase to decrease pumping friction loss, or to control fluid loss. The polymer can comprise less than 0.1 weight percent of the aqueous phase because the emulsion itself and not the polymer, is the main contributor to viscosity. At concentrations under 0.1 percent the polymer imparts a viscosity of less than 10 centipoise to the aqueous phase. The polymer, at such low concentrations, does not have to undergo degradation in order to permit easy removal of the fracturing fluid. Consequently, problems associated with polymer degradation residues or polymer sensitivity are not encountered. Breaking of the emulsion is all that is necessary to revert the emulsion to a low viscosity fluid.

The polymeric thickening agent can either be a synthetic polymer or a natural gum. Synthetic polymers include acrylic polymers, vinyl polymers, and cellulose derivatives. The synthetic polymers most frequently used are polyacrylamide and hydroxyethylcellulose. Natural gums include guar gum, gum arabic, gum karaya, gum tracaganth, and the microbial fermentation gums. Natural gums, especially guar gum, are preferred over the synthetic polymers because they are usually more effective in controlling fluid loss and reducing pumping friction loss.

The polymeric thickening agent is frequently used in conjunction with other fluid loss additives. A fluid loss control additive frequently used is a blend of silica flour and a commercial additive sold under the tradename "Admomite Aqua". One of the constituents of Admomite Aqua is guar gum. Normally, about 20 to 50 pounds of this particulate fluid loss composition per 1000 gallons of emulsion is employed in the fracturing fluid. Tests have shown that the presence of guar gum in the fluid loss additive when used at this concentration only imparts a viscosity to the aqueous phase of about 6 centipoises when measured at 70°F and a shear of 500 reciprocal seconds.

The emulsion phase prepared in accordance with the above embodiments will satisfy nearly all the requirements for an effective fracturing fluid. The fluids promote high fracture conductivity and yet provide relatively low friction loss. Proppant suspension capability of the fluids is excellent. Because the emulsion is stabilized by a nonionic surfactant and contains little or no polymer, the fracturing fluid is insensitive to formation contaminants. Finally, the fluid is designed to revert to a low viscosity fluid by temperature responsive phase inversion, permitting rapid and easy well cleanup.

LABORATORY EXPERIMENTS

Laboratory experiments were carried out with different emulsions to determine their fluid properties and breaking characteristics. Other experiments were conducted to compare the emulsion of the present invention with other fracturing fluids.

FIG. 1 is a plot of apparent viscosity versus oil phase concentration for two emulsion systems containing different amounts of nonionic surfactant. The viscosities of the two systems were measured by a Model 50 Fann Viscometer at 70°F and a shear rate of 500 reciprocal seconds. Concentration of the internal oil phase was varied from 50 percent to 86 percent. An ethoxylated tridecyl linear alcohol was used as the nonionic surfactant and Number 2 diesel oil was used as the internal oil phase component.

The plot illustrates the change in the viscosity as the concentration of the external hydrocarbon phase increased from 50 to 86 volume percent. Note that for the system containing a low concentration of surfactant (0.5 weight percent of the aqueous phase) a maximum viscosity is obtained at about the 75 percent internal oil phase concentration. Beyond that oil phase concentration, the emulsion begins to lose stability. However, when the concentration of the surfactant was increased in the aqueous phase to 2.0 percent, the stability of the emulsion improved sufficiently such that viscosity steadily increased with increasing oil concentration. With a surfactant concentration of 2.0 percent, a stable emulsion with an oil phase concentration as high as 86 volume percent was obtained. The data indicates that when surfactant concentrations of 2.0 percent or more are used in the emulsion then an emulsion with a viscosity of 100 centipoises or more can be obtained at an oil phase concentration of 75 volume percent or higher. A preferred oil phase concentration range has been found to be from about 75 to about 85 volume percent.

Figure 2:
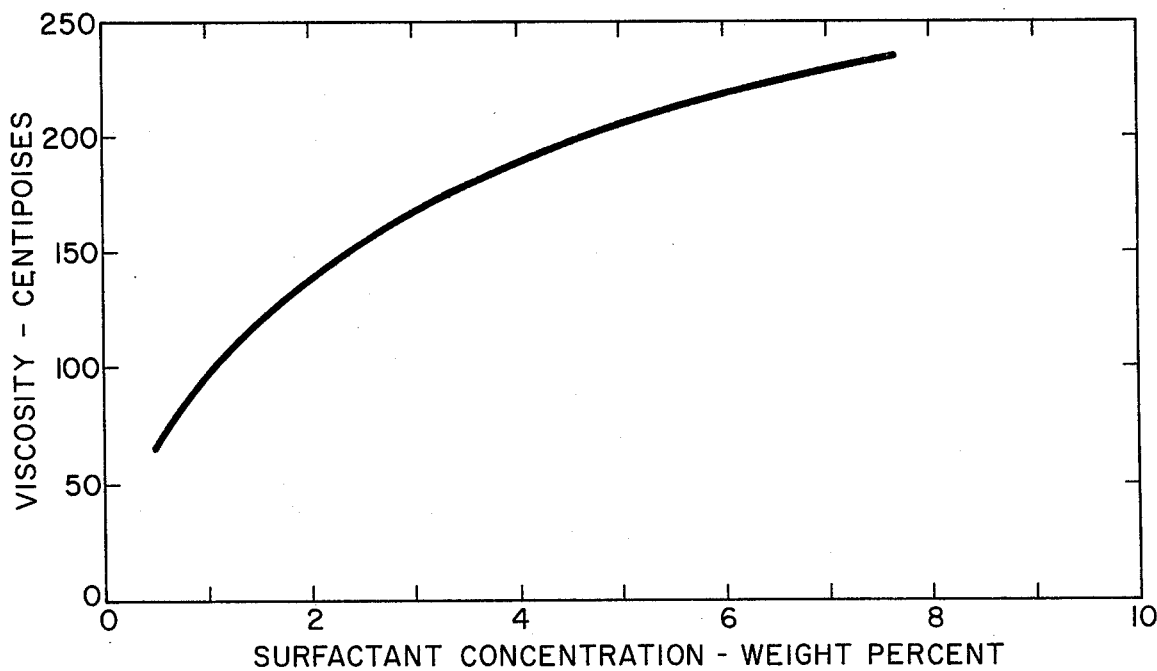
FIG. 2 is a plot showing the relationship between the viscosity of an oil-in-water emulsion and the concentration of a nonionic surfactant used to stabilize the emulsion.

FIG. 2 is a plot of apparent viscosity versus surfactant concentration for an emulsion with an internal oil concentration of 80 volume percent. Number 2 diesel oil, as the oil phase component, and an ethoxylated tridecyl linear alcohol nonionic surfactant were again used. Shear rate was maintained at 500 reciprocal seconds. The data shows that viscosity steadily increases as the surfactant concentration increases from 0.5 to 7.0 weight percent in the aqueous phase. The increase, however, is asymptotic and indicates that at surfactant concentrations in excess of about 6.0 percent, there are only minimal increases in viscosity. Consequently, a surfactant concentration range of from about 1.0 to about 6.0 weight percent will generally impart a viscosity of about 100 centipoise or more to the emulsion. However, the type of nonionic surfactant selected, the type of liquid hydrocarbon selected, and, of course, the oil phase concentration will also affect viscosity. Nevertheless, this range indicates reasonable upper and lower concentration limits for the surfactant when working with emulsions having about 70 to 90 volume percent oil concentration in the internal phase.

From the data shown in FIGS. 1 and 2, it appears that an emulsion suitable for most fracturing operations preferably has an oil concentration in the internal phase of from about 75 to about 85 volume percent and a nonionic surfactant concentration of from about 2.0 to about 4.0 weight percent in the external aqueous phase. At these concentration ranges, a stable emulsion with an apparent viscosity greater than 100 centipoises will almost always be obtained. However, circumstances may dictate concentrations outside of these ranges, with concentrations of the internal oil phase varying from as little as 70 to as much as 90 volume percent and the surfactant concentrations varying from about 1.0 to about 6.0 weight percent of the aqueous phase.

Figure 3:
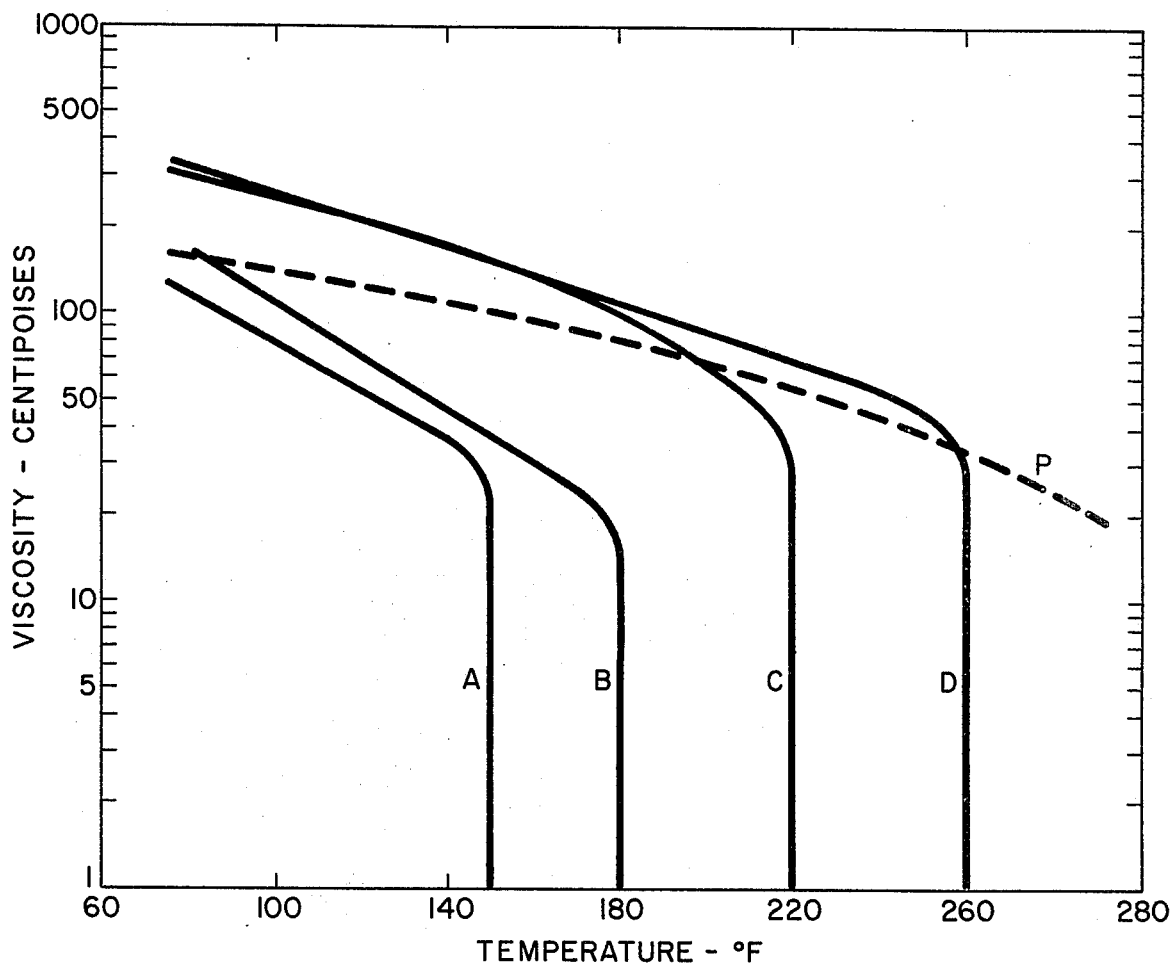
FIG. 3 is a plot showing the relationship between viscosity and temperature for emulsions stabilized by nonionic surfactants and an emulsion containing a polymeric thickening agent.

FIG. 3 is a plot of apparent viscosity versus temperature for several emulsion systems of the present invention (A, B, C and D) and the polymer emulsion (P), described by O. M. Kiel in U.S. Pat. No. 3,710,865. The composition of each emulsion is set forth in Table I. Note the presence of nonionic surfactants in emulsions A, B, C and D, and a cationic surfactant in P.

TABLE I

| Emulsion | Oil/Water Ratio | Surfactant | Surfactant Concentration (Weight % of Aqueous Phase) | Electrolyte Concentration (Weight % of Aqueous Phase) | Polymer |
|---|---|---|---|---|---|
| A | 80:20 | Tergitol 15-S-9 (Nonionic) | 2.0 | 1.0 KCl | None |
| B | 80:20 | Tergitol 15-S-12 (Nonionic) | 2.0 | 8.0 KCl | — |
| C | 80:20 | Tergitol NP-40 (Nonionic) | 2.0 | 8.0 NaCl | — |
| D | 80:20 | Tergitol NP-40 (Nonionic) | 2.0 | 1.0 KCl | — |
| P | 67:33 | Exxon Chemical 8596 (Cationic) | 0.5 | 1.0 KCl | 0.6% Guar Gum in aqueous Phase |

The surfactants used in emulsion A and B (Tergitol 15-S-9 and 15-S-12) are ethoxylated linear secondary alcohols having 11 to 15 carbon atoms. Surfactant 15-S-9 is slightly more hydrophilic and has a lower cloud point than 15-S-12. The surfactant used in emulsion C and D (Tergitol NP-40) is an ethoxylated nonylphenol which is highly hydrophilic and which has a cloud point in excess of 100°C while emulsion P contains a quaternary amine cationic surfactant. Emulsions A, B, C, and D also have higher oil phase concentration than P. Emulsion P, however, contains about 0.6% guar gum as a thickening agent in the aqueous phase. All of the emulsions contain varying amounts of either NaCl or KCl.

The data presented by FIG. 3 illustrates the temperature breaking characteristics of the emulsions in the present invention as opposed to the relative temperature insensitivity of the polymer emulsion. The viscosity of emulsion A drops off precipitously at 150°F, emulsion B at 180°F, emulsion C at 220°F, and emulsion D at 260°F. These temperatures, at which viscosity suddenly declines, are the emulsion breaking temperature for each of the emulsion systems containing the nonionic surfactant. The polymer emulsion P, however, maintains a relatively high viscosity at temperatures as high as 300°F. Although this temperature insensitivity is desirable when fracturing a formation, it is clearly undesirable when the fracturing fluid must be removed. Thus, if a well had a formation temperature of about 270°F, then emulsions D and P would be suitable fracturing fluids. But once the fracturing operation is completed, only emulsion D, after rising to and breaking at its emulsion breaking temperature of 260°F, could be easily removed. Similarly, emulsions A, B, or C would be the preferable fracturing fluid if the formation temperature was slightly above their breaking temperatures.

The effect of the electrolyte concentration is also illustrated by the data of FIG. 3. Emulsions C and D are identical except for the type and concentration of electrolyte used. Emulsion C has 8% NaCl in the aqueous phase while D has 1% KCl. This difference accounts for a 40°F variation in the emulsion breaking temperature and indicates the impact that small variations in electrolyte concentration can have on the emulsion breaking temperature. By modifying the amount of electrolyte used it is, therefore, possible to prepare an emulsion with almost any desired breaking temperature. Although any amount of electrolyte can be added, up to saturation of the aqueous phase, it has been found that concentrations ranging from about 1.0 to about 10.0 weight percent will generally give the emulsion the desired breaking temperature.

Tests were also conducted to determine permeability reductions after treatment with the polymer emulsion and the emulsion of the present invention. Tests were conducted on an 11 inch Berea core of 1 inch width and 1 inch thickness. The core had a pore volume of 54 cubic centimeters. Oil permeability of the cores was measured before and after a treatment which consisted of injecting the emulsion into the core, heating the core at 140°F for 24 hours and then removing the emulsion by displacement with diesel oil. The polymer emulsion tested had an oil to water ratio of 67:33. It contained 0.6 weight percent guar gum and 0.5 weight percent of a quaternary amine cationic emulsifier in the aqueous phase. The emulsion of the present invention had an oil-water ratio of 80:20 and contained 2.0% weight percent Tergitol 15-S-12 nonionic surfactant in the aqueous phase. Both emulsions contained 6.0 weight percent NaCl in the aqueous phase. The results, summarized in Table II, show that the polymer emulsion significantly reduced oil permeability in the core while the emulsion of the present invention had no effect on permeability.

TABLE II

| Fluid | Permeability (Millidarcies) Before | After | Permeability Reduction (Percent) |
|---|---|---|---|
| Emulsion (Polymer) | 363 | 263 | 27.5 |
| Emulsion (Non polymer) | 358 | 363 | None |

It should be emphasized that in the above tests the guar gum present in the polymer emulsion was not degraded. Had the guar gum in the polymer emulsion been degraded, deposition of degraded guar residues in the core sample would have occurred, resulting in a greater permeability reduction than was obtained under the test conditions described above.

FIELD EXAMPLES

1. A south Texas well producing from a sandstone formation at 5154 feet was fractured by the method of the present invention. The formation had an average temperature of 163°F and a permeability of 30 millidarcies. Located at the wellsite location were two 500 barrel tanks. The first tank contained 75 barrels of lease brine and the second tank contained 375 barrels of lease crude oil. To the brine tanks was added 94.5 gallons of a polyoxy-ethylene nonionic surfactant. Next, 550 pounds of potassium chloride was added to the aqueous solution. The surfactant comprised about 3.0 weight percent of the aqueous solution and the potassium chloride about 2.0 weight percent.

The aqueous solution was then blended with the crude oil to form an emulsion containing about 83 volume percent oil in the internal phase and about 17 volume percent aqueous solution in the external phase. Recirculation of the emulsion through the blending equipment and injection pumps was sufficient to form a highly stable, homogeneous emulsion. The emulsion had a breaking temperature of 150°F.

The emulsion was then fused to fracture the formation. A pad of about 3000 gallons of emulsion containing 20 pounds per gallon of Adomite Aqua fluid loss additive was first injected into the well at a rate and pressure sufficient to fracture the formation. Following the pad, the emulsion, acting as a carrier for about 24,000 pounds of 20/40 silica sand propping agent particles, was injected into the formation.

During the fracturing operation, the average injection rate was maintained at about 8.5 barrels per minute through 2.441 i.d. tubing and the pressure was maintained at about 4700 psi. Following fluid injection, the well was shut in for about 36 hours. When the well was returned to production, samples of produced fluids consisted of two low viscosity phases, indicating that the emulsion had broken by temperature responsive phase inversion.

After the well was cleaned up, the well was put on test and produced 336 barrels of oil per day. Prior to fracturing, the well was dead to a 100 psi casing head system, but would flow into a tank at a rate of 120 barrels of oil per day.

2. The above procedure was repeated for a second producing well. The well formation was sandstone and was located at a depth of 5986 feet. Average temperature was 175°F and permeability was 100 millidarcies.

The fracturing operation procedure described in Field Example 1 was followed, the only difference being the oil to water ratio. In the second test, the internal oil phase was 80 volume percent and the aqueous (brine) phase was 20 volume percent. The emulsion breaking temperature was 150°F.

The average injection rate was maintained at about 8.0 barrels per minute through 2.441 i.d. tubing. Fracturing pressure was about 5100 psi. Approximately the same amounts of fluid loss additive and propping agent particles were used in the second test.

Once again, well cleanup was rapid and easily accomplished, the emulsion reverting to its two low viscosity phases after a 36 hour shut in period. Prior to treatment, the well was producing 126 barrels of oil per day and 0.12 million cubic feet of gas per day. Following the fracturing treatment, the production rate tested at 180 barrels of oil per day and 1.64 million cubic feet of gas per day.

We claim:

1. A method of fracturing a subterranean formation surrounding a wellbore which comprises:
    a. injecting into said formation, at a pressure sufficient to fracture said formation, an oil-in-water emulsion which contains from about 70 to about 90 volume percent of an internal liquid hydrocarbon phase, from about 10 to about 30 volume percent of an external aqueous phase, and a nonionic surfactant which gives said emulsion a breaking temperature that is not greater than the temperature of said formation and which is added in an amount sufficient to stabilize said emulsion and to impart to said emulsion a viscosity of at least 100 centipoises at 70°F and a shear rate of about 500 reciprocal seconds; and
    b. thereafter breaking said emulsion by leaving said emulsion in said wellbore for a sufficient time to permit the temperature of said emulsion to reach said breaking temperature.

2. The method as defined in claim 1 wherein said emulsion contains an electrolyte to adjust the temperature at which said emulsion breaks.

3. The method as defined in claim 2 wherein said electrolyte is one which lowers the cloud point of said surfactant.

4. The method as defined in claim 3 wherein said electrolyte is selected from the group consisting of sodium citrate, sodium sulfate, potassium sulfate, lithium sulfate, berrylium sulfate, sodium hydroxide, sodium bisulfate, sodium acetate, sodium bromate, magnesium chloride, sodium chloride, calcium chloride, cesium chloride, potassium chloride, lithium chloride, and potassium nitrate and mixtures thereof.

5. The method as defined in claim 2 wherein said electrolyte is one which raises the cloud point of said surfactant.

6. The method as defined in claim 5 wherein said electrolyte is selected from the group consisting of magnesium iodide, sodium iodide, berrylium nitrate, magnesium nitrate, and calcium nitrate and mixtures thereof.

7. The method as defined in claim 1 wherein said emulsion contains not more than about 0.1 weight percent of a polymeric thickening agent in said aqueous phase, said polymer thickening agent imparting a viscosity to said aqueous phase of less than 10 centipoises at 70°F and a shear rate of about 500 reciprocal seconds.

8. The method as defined in claim 1 wherein said emulsion contains an effective quantity of a particulate fluid loss additive.

9. The method as defined in claim 1 wherein said hydrocarbon phase contains a liquid hydrocarbon selected from the group consisting of crude oil, diesel oil, gas oil, gasoline, kerosene, benzene, toluene, ethylbenzene, perchloroethylene, cyclohexane, heptane, decane and hexadecane and mixtures therof.

10. The method as defined in claim 1 wherein said nonionic surfactant is added in an amount equal to from about 1.0 to about 6.0 weight percent of said aqueous phase.

11. The method as defined in claim 1 wherein said nonionic surfactant is a polyoxyethylene derivative.

12. The method as defined in claim 11 wherein the oleophilic moeity of said polyoxyethylene derivative is derived from a polar chemical selected from the group consisting of alcohols, alkyl phenols, cresols, fatty acids, amides, amines and mercaptans.

13. The method as defined in claim 1 wherein said emulsion contains from about 75 to about 85 volume percent of an internal liquid hydrocarbon phase and from about 15 to about 25 volume percent of an external aqueous phase.

14. The method as defined in claim 1 wherein said emulsion breaking temperature is from about 1°F to about 40°F lower than the temperature of said formation.

15. A method of fracturing a subterranean formation surrounding a well which comprises:
   a. preparing a fracturing fluid by contacting a liquid hydrocarbon with an aqueous fluid in the presence of sufficient amounts of a nonionic surfactant to form a stable oil-in-water emulsion having a viscosity of at least 100 centipoises at 70°F and a shear rate of about 500 reciprocal seconds and having a breaking temperature that is not greater than the temperature of said formation, said liquid hydrocarbon comprising from about 70 to about 90 volume percent of said emulsion, said aqueous fluid comprising from about 10 to about 30 volume percent of said emulsion; and
   b. injecting said emulsion down said well at a pressure sufficient ot fracture said formation; and
   c. thereafter breaking said emulsion by leaving said emulsion in said wellbore for a sufficient time to permit the temperature of said emulsion to reach said breaking temperature.

16. A method as defined in claim 15 wherein said aqueous fluid contains an electrolyte to adjust the temperature at which said emulsion breaks.

17. The method as defined in claim 15 wherein said fracturing fluid contains not more than about 0.1 weight percent of a polymeric thickening agent in said aqueous fluid, said polymeric thickening agent imparting a viscosity to the aqueous phase of less than about 10 centipoises at 70°F and a shear rate of about 500 reciprocal seconds.

18. The method as defined in claim 15 wherein said emulsion contains an effective quantity of a particulate fluid loss additive.

19. The method as defined in claim 15 wherein said nonionic surfactant is added in an amount equal to from about 1.0 to about 6.0 weight percent of said aqueous fluid.

20. A method of fracturing a subterranean formation surrounding a wellbore which comprises:
   a. injecting into said formation, at a pressure sufficient to fracture said formation, an oil-in-water emulsion which contains from about 75 to about 85 volume percent of an internal hydrocarbon phase, from about 15 to about 25 volume percent of an aqueous phase, and a nonionic surfactant which gives said emulsion a breaking temperature that is not greater than the temperature of said formation and which is added in an amount equal to from about 2.0 to about 4.0 weight percent of said aqueous phase, said amount of nonionic surfactant being sufficient to stabilize said emulsion and to impart to said emulsion a viscosity of at least 100 centipoises at 70°F and a shear rate of about 500 reciprocal seconds; and
   b. thereafter breaking said emulsion by leaving said emulsion in said wellbore for a sufficient time to permit the temperature of said emulsion to reach said breaking temperature.

21. The method as defined in claim 20 wherein said emulsion breaking temperature is adjusted by the addition of from about 0.1 weight percent to a saturating amount of an electrolyte to said aqueous phase.

22. The method of fracturing a subterranean formation surrounding a wellbore which comprises:
   a. injecting into said formation, at a pressure sufficient to fracture said formation, an oil-in-water emulsion which contains from about 75 to about 85 volume percent of an internal liquid hydrocarbon phase, from about 15 to about 25 volume percent of an aqueous phase, said aqueous phase containing from about 1.0 to about 10.0 weight percent of an electrolyte, and a nonionic surfactant which is added in an amount equal to from about 2.0 to about 4.0 weight percent of said aqueous phase, said amount of nonionic surfactant being sufficient to stabilize said emulsion and to impart to said emulsion a viscosity of at least 100 centipoises at 70°F and a shear rate of about 500 reciprocal seconds, said nonionic surfactant and said electrolyte being combined in proportions which give said emulsion a breaking temperature that is not greater than the temperature of said formation; and
   b. thereafter breaking said emulsion by leaving said emulsion in said wellbore for a sufficient time to permit the temperature of said emulsion to reach said breaking temperature.

23. A method of fracturing a subterranean formation surrounding a wellbore which comprises:
   a. injecting into said formation, at a pressure sufficient to fracture said formation, an oil-in-water emulsion which contains from about 70 to about 90 volume percent of an internal liquid hydrocarbon phase, from about 10 to about 30 volume percent of an aqueous phase containing from about 1.0 to about 10.0 weight percent of an electrolyte, a nonionic surfactant which is added in an amount equal to from about 1.0 to about 6.0 weight percent of said aqueous phase, said amount of nonionic surfactant being sufficient to stabilize said emulsion and to impart to said emulsion a viscosity of at least 100 centipoises at 70°F and a shear rate of about 500 reciprocal seconds, said nonionic surfactant and said electrolyte being combined in proportions which give said emulsion a breaking temperature which is less than the temperature of the formation, and not more than about 0.1 weight percent of a polymeric thickening agent, said polymeric thickening agent imparting a viscosity to the aqueous phase of less than about 10 centipoises at 70°F and a shear rate of about 500 reciprocal seconds; and
   b. thereafter breaking said emulsion by leaving said emulsion in said wellbore for a sufficient time to permit the temperature of said emulsion to reach said breaking temperature.

* * * * *